US008400875B2

(12) United States Patent
 Pederson

(10) Patent No.: US 8,400,875 B2
(45) Date of Patent: Mar. 19, 2013

(54) ACTIVE SONAR SYSTEM AND ACTIVE SONAR METHOD USING A PULSE SORTING TRANSFORM

(75) Inventor: Thomas B. Pederson, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 215 days.

(21) Appl. No.: 12/754,884

(22) Filed: Apr. 6, 2010

(65) Prior Publication Data
 US 2011/0242939 A1 Oct. 6, 2011

(51) Int. Cl.
 *G01S 15/00* (2006.01)
(52) U.S. Cl. ........................................... 367/89
(58) Field of Classification Search .................. 367/89
 See application file for complete search history.

(56) References Cited

U.S. PATENT DOCUMENTS

| 3,970,791 | A | | 7/1976 | Johnson |
| 4,185,701 | A | | 1/1980 | Boys |
| 4,358,735 | A | | 11/1982 | Boys |
| 4,433,240 | A | | 2/1984 | Seeman |
| 4,546,355 | A | * | 10/1985 | Boles ............................ 342/179 |
| 4,723,124 | A | * | 2/1988 | Boles ............................ 342/25 C |
| 4,851,854 | A | | 7/1989 | Drogin |
| 5,061,930 | A | | 10/1991 | Nathanson et al. |
| 5,091,917 | A | | 2/1992 | Udd et al. |
| 5,276,772 | A | | 1/1994 | Wang et al. |
| 5,319,974 | A | * | 6/1994 | Lenz et al. ................... 73/290 V |
| 5,379,770 | A | * | 1/1995 | Van Veen ....................... 600/455 |
| 5,381,151 | A | * | 1/1995 | Boles et al. ....................... 342/21 |
| 5,483,063 | A | | 1/1996 | Hall, Jr. et al. |
| 5,561,641 | A | * | 10/1996 | Nishimori et al. ................ 367/90 |
| 5,563,982 | A | | 10/1996 | Wang et al. |
| 5,613,039 | A | | 3/1997 | Wang et al. |
| 5,899,984 | A | | 5/1999 | Wang et al. |
| 6,043,771 | A | | 3/2000 | Clark et al. |
| 6,147,646 | A | | 11/2000 | Arneson et al. |
| 6,411,249 | B1 | | 6/2002 | Rose |
| 6,714,155 | B1 | * | 3/2004 | Rose ............................ 342/107 |
| 2005/0128135 | A1 | * | 6/2005 | Hester et al. ................... 342/103 |
| 2006/0140054 | A1 | * | 6/2006 | Intrator et al. ................. 367/135 |
| 2009/0058718 | A1 | * | 3/2009 | Pryszo et al. .................... 342/179 |
| 2010/0097265 | A1 | * | 4/2010 | Huebschman ................. 342/179 |

OTHER PUBLICATIONS

Overman, et al.; "The Pulse Sorting Transform;" IEEE Transaction on Circuits and Systems; Oct. 1990; vol. 37; No. 10; pp. 1193-1200.

* cited by examiner

*Primary Examiner* — Isam Alsomiri
*Assistant Examiner* — James Hulka
(74) *Attorney, Agent, or Firm* — Daly, Crowley, Mofford & Durkee, LLP

(57) ABSTRACT

An active sonar system, a method associated therewith, and a computer-readable medium associate therewith, each provide a method of sonar signal processing. The method includes receiving a plurality of initial detections of a target and associated initial detection times, associated with sound transmitted at a pulse rate interval (PRI), and associated with received sound including echoes from a target. The echoes result from the transmitted sound. The method also includes analyzing the plurality of initial detection times with a pulse sorting transform configured to identify periodic PST detection times within the plurality of initial detection times that are equally spaced in time and that are representative of the echoes from the target.

26 Claims, 8 Drawing Sheets

ACTIVE SONAR SYSTEM AND ACTIVE SONAR METHOD USING A PULSE SORTING TRANSFORM

FIELD OF THE INVENTION

This invention relates generally to active sonar systems and, more particularly, to active sonar systems and methods that provide reduced noise and also advanced processing techniques that result in improved detection of underwater objects, for example, underwater mines.

BACKGROUND OF THE INVENTION

It is known that an underwater vessel (i.e., a submarine) generates sound as it travels through the water. The sound is generated by a variety of sources, including, but not limited to, sound generated by a submarine propulsion system, sound generated by a submarine propeller, and sound generated by a submarine electrical power generator. It is known that submarine designers attempt to reduce these and other sound sources in order to make a submarine difficult to detect by passive acoustic means, therefore remaining as covert as possible.

Some water-born objects do not emit sound, for example, underwater mines. These objects cannot be detected by the sounds they make.

While a conventional passive sonar system merely listens for sounds made by a target of interest, a conventional active sonar system transmits acoustic energy in bursts, called "pings", which travel at the speed of sound through the water. Some of the acoustic energy reflects from objects in or on the water back toward the active sonar system. These reflections, referred to as "echoes," are received by acoustic sensors at the active sonar system.

Both active and passive sonar systems must operate in an environment filled with acoustic noises generated by a variety of noise sources, including, but not limited to, ships, surface waves, wind, geologic noises, and biologic noises.

Detection electronics, which forms a part of the active sonar system, performs processing upon the received echoes to improve the likelihood that only echoes from targets of interest are identified and reported to a sonar system operator. However, as described above, the undersea acoustic environment is very noisy, and despite the application of sophisticated detection processing algorithms, the active sonar system may still falsely identify random bursts of noise as targets. These false detections are referred to as "false alarms." If the consequences of reporting a false alarm are severe, then steps can be taken to further reduce a probability of the false alarms, but usually these steps also reduce the probability that a real target of interest will be detected.

A variety of approaches have been used in sonar systems to improve performance in the presence of the noisy ocean environment. For example, both active and passive sonar systems tend to do receive and/or transmit beamforming. Receive beamforming, for both passive and active sonar systems, tends to result in blocking out of directions from which noises may come. Transmit beamforming, for active sonar systems, tends to result in higher power in a transmit beam, and therefore, a stronger echo from an object in or on the water.

Another approach used in sonar systems to improve performance is a matched-filter technique, which will be understood to those of ordinary skill in the art to take a variety of forms in the time or frequency domains.

Another approach used in active sonar systems to improve performance is a "chaining algorithm" that attempts to identify echoes that appear in adjacent ping cycles at ranges consistent with a real target moving at a realistic speed.

It is known that sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example, at a sonar system that receives passive sound from an underwater target. Other propagation models accomplish the equivalent function but are less computationally convenient.

As is also known, sound that travels underwater can often take more than one propagation path. For example, sound can take a "direct propagation path" from a sound source to a sound receiver, which path may curve but not intercept the surface or bottom of the ocean. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Through there exist a very large number of sound propagation paths between a sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

Conventional active sonar systems tend to operate with direct sound paths between the active sonar system and the target of interest. However, conventional active sonar systems also experience (i.e., receive) sound reflecting from the ocean surface and from the ocean bottom. Active sonar systems must distinguish an echo from a target from a reflection from the oceans surface or from the ocean bottom.

It would be desirable to provide new approaches used in active sonar systems to improve performance in the presence of the noisy ocean environment. For example, it would be desirable to provide improved detection, localization, and classification of objects in the water. It would also be desirable to reduce a probability of false alarm.

SUMMARY OF THE INVENTION

The present invention provides an active sonar system and method having advance processing techniques that use a pulse sorting transform (PST) so as to better detect, localize, and characterize an object in the water. The PST techniques provide, in particular, at least a reduced probability of false alarm. In some embodiments, the PST techniques can also provide an increased probability of detection.

In accordance with one aspect of the present invention, a method of sonar signal processing includes receiving a plurality of initial detections of a target and associated initial detection times, associated with sound transmitted at a pulse rate interval (PRI), and associated with received sound including echoes from a target. The echoes result from the transmitted sound. The method also includes analyzing the plurality of initial detection times with a pulse sorting transform configured to identify periodic PST detection times within the plurality of initial detection times that are equally spaced in time and that are representative of the echoes from the target.

In accordance with another aspect of the present invention, a computer-readable storage medium having computer readable code thereon for providing sonar signal processing includes instructions for receiving a plurality of initial detections of a target and associated initial detection times, associated with sound transmitted at a pulse rate interval (PRI), and associated with received sound including echoes from a target. The echoes result from the transmitted sound. The computer-readable storage medium also includes instructions for analyzing the plurality of initial detection times with a pulse sorting transform configured to identify periodic PST detection times within the plurality of initial detection times that are equally spaced in time and that are representative of the echoes from the target.

In accordance with yet another aspect of the present invention, a sonar system includes a pulse sorting transform (PST) module. The PST module is coupled to receive a plurality of initial detections of a target and associated initial detection times, associated with sound transmitted at a pulse rate interval (PRI), and associated with received sound including echoes from a target. The echoes result from the transmitted sound. The PST module is configured to analyze the plurality of initial detection times with a pulse sorting transform and configured to identify periodic PST detection times within the plurality of initial detection times that are equally spaced in time and that are representative of the echoes from the target.

BRIEF DESCRIPTION OF THE DRAWINGS

The foregoing features of the invention, as well as the invention itself may be more fully understood from the following detailed description of the drawings, in which:

FIG. 1A is a graph showing exemplary sound transmission times and echo reception times of an active sonar system for a target having non-zero relative velocity relative to the active sonar system;

DETAILED DESCRIPTION OF THE INVENTION

Before describing the present invention, some introductory concepts and terminology are explained.

It should be understood that a detection of a target in the water is probabilistic. As used herein, the term "probability of detection" is used to describe a probability that a real target echo is detected, when a real target echo exists, within one active sonar ping cycle or within any selected number of active sonar ping cycles. A high processing detection threshold tends to reduce a probability of detection and a low processing detection threshold tends to increase a probability of detection.

As used herein, the term "probability of false alarm" is used to describe a probability that, within one active sonar ping cycle or within any selected number of active sonar ping cycles, a false echo will be detected, i.e., there will be a false detection of an echo that is really noise. A high processing detection threshold tends to reduce a probability of false alarm and a low processing detection threshold tends to increase a probability of false alarm. It will, therefore, be understood that the processing detection threshold is selected to result in a desirable probability of detection along with a desirable probability of false alarm.

For an active sonar system, the probability of detection and the probability of false alarm tend to improve as a range between a sonar system and a target decreases.

As is known, some objectives of sonar systems are to achieve as high a probability of detection as possible and to achieve as low a probability of false alarm as possible. To this end, sonar systems use a variety of advance processing techniques. The pulse sorting transform (PST) techniques described herein provide at least a lower probability of false alarm when viewed not over one ping cycles, but over a plurality of active sonar ping cycles. In part because the probability of false alarm is reduced, in some embodiments, by using the PST techniques, the processing detection threshold can be reduced, resulting also in an improved probability of detection over the plurality of ping cycles. Therefore, the PST techniques described herein can also provide a higher probability of detection.

As used herein, the terms "initial detection" and "initial detection time" are used to describe a detection of a target before the PST techniques are applied. As used herein, the terms "PST detection" and "PST detection time" and are used to describe a detection of a target after the PST techniques are applied to the initial target detection and the initial target detection time.

Figure 1:
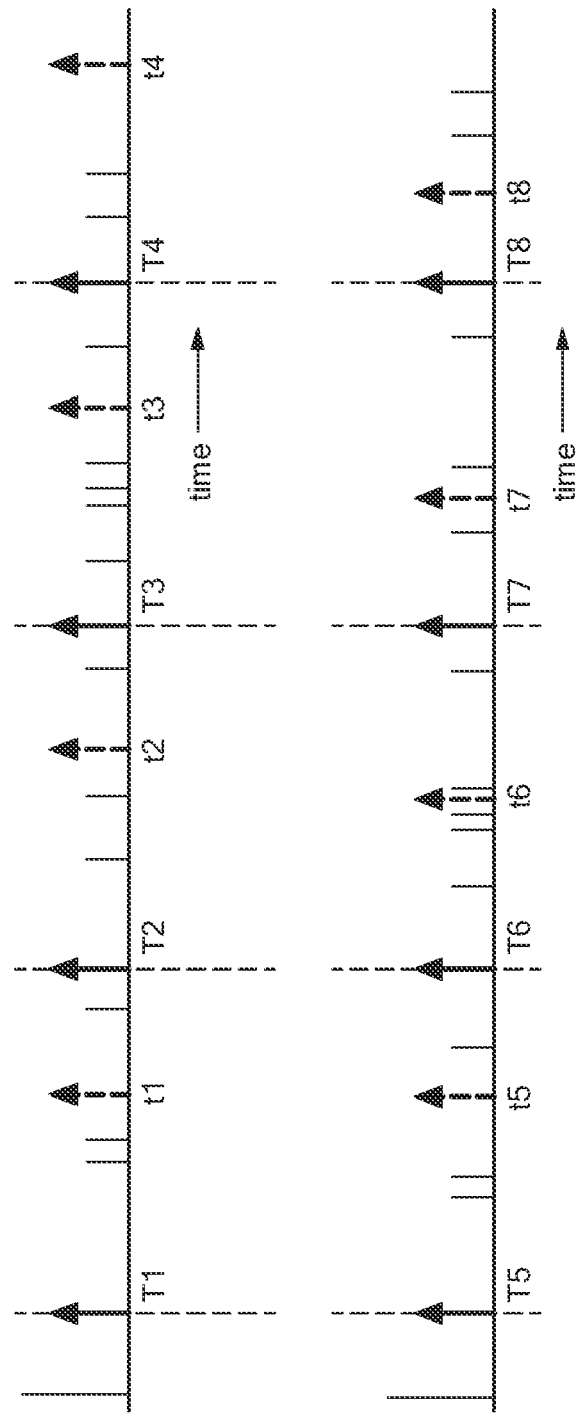
FIG. 1 is a graph showing exemplary sound transmission times and echo reception times of an active sonar system for a target having a zero relative velocity relative to the active sonar system.

Referring to FIG. 1 thick solid arrows at times T1, T2, T3, and T4 are representative of times of sound pulse transmissions (pings) from an active sonar system. The pings occur at a rate having an interval between pings commonly referred to as a pulse rate interval (PRI), which is the same as a period of the ping rate. In many sonar systems, the PRI is several seconds, corresponding to the time that it might take for the transmitted sound to travel through the water, impinge upon a target, and an echo to return from the target at a maximum detection range, which may be on the scale of miles.

Dashed arrows at times t1, t2, t3, and t4 are representative of the arrival times of target echoes at the sonar system, wherein the echo at time t1 is the result to the ping at time T1, the echo at time t2 is the result to the ping at time T2, the echo at time t3 is the result to the ping at time T3, and the echo at time t4 is the result to the ping at time T4. The echoes occur at a rate having an interval between echoes referred to herein as an "echo pulse rate interval: or "EPRI." The positions of the dashed arrows are representative of echoes a target at a particular range from the active sonar system and with a zero relative velocity relative to the active sonar system.

Lines without arrowheads are representative of false echoes, in other words, false initial detections of echoes that do not actually exist. The false detections (false alarms) can be the result of noise in the detection processing, either acoustic noise or electrical noise. From the above definition of initial detections, the dashed lines may also be representative of initial detections, but of actual echoes that do exist. These lines are shown to have lower magnitude than other lines for clarity, and not to represent a relative magnitude.

Range to the target is related to time differences between transmitted pings and received echoes, for example, a time difference between times T1 and t1, T2 and t2, T3 and t3, and T4 and t4. Because these time differences are the same (i.e., the range to the target does not change), it can be known that the relative velocity between the active sonar system and the target is zero.

As shown, for a zero relative velocity between the active sonar system and the target, the PRI is the same (equal to) as the EPRI. Furthermore, if the PRI is periodic as shown, the EPRI is also periodic.

It will be understood from discussion below, that the periodicity of the echoes (dashed lines), by way of the PST techniques described herein, allows the echoes (dashed lines) to be identified from among the false initial detections (solid lines).

Though the dashed arrows representative of return echoes are shown to have the same length or magnitude as the thick solid arrows representative to transmitted pings, it will be understood that, at the sonar system, the transmitted pings tend to have much higher amplitude than the return echoes.

Referring now to FIG. 1A, thick solid arrows at times T5, T6, T7, and T8 are representative of times of sound pulse transmissions (pings) from an active sonar system. For clarity, the pings are shown to occur with the same PRI as the pings of FIG. 1.

Dashed arrows at times t5, t6, t7, and t8 are representative of the arrival times of target echoes at the sonar system, but, unlike the echoes represented in FIG. 1, for a target that has a non-zero relative velocity relative to the sonar system. The echo at time t5 is the result to the ping at time T5, the echo at time t6 is the result to the ping at time T6, the echo at time t7 is the result to the ping at time T7, and the echo at time t8 is the result to the ping at time T8.

As in FIG. 1, lines without arrowheads are representative of false echoes, in other words, false initial detections of echoes that do not actually exist.

Also as in FIG. 1 range to the target is related to time differences between transmitted pings and received echoes, for example, a time difference between times T5 and t5, T6 and t6, T7 and t7, and T8 and t8. Because these time differences are the not same (i.e., the range to the target changes), it can be known that the relative velocity between the active sonar system and the target is not zero.

As shown, even for a non-zero relative velocity between the active sonar system and the target, if the PRI is periodic, the EPRI is also periodic. However, for the non-zero relative velocity, the EPRI does not equal the PRI. Techniques described below make use of these characteristics.

As described above, it will be understood from discussion below, that the periodicity of the echoes (dashed lines), by way of the PST techniques described herein, allows the echoes (dashed lines) to be identified from among the false initial detections (solid lines), even for the moving target.

In some conventional active sonar systems, range is calculated by methods indicated above, i.e., by time differences, e.g., a time difference between times T5 and t5. However, in some conventional sonar systems, a relative velocity of a target is calculated using Doppler principals, e.g., by using a frequency difference between a frequency of a transmitted ping, e.g., 10 kHz, and a frequency of a corresponding return target echo, e.g., 10.125 kHz.

In contrast, by comparison of FIGS. 1 and 1A and using systems and techniques described herein, it will become apparent that a relative velocity can also be calculated by a difference between the PRI and the EPRI.

Some conventional active sonar systems determine if a target has been detected by processing return echoes individually. In order to detect a target, some conventional sonar systems merely calculate a threshold level and identify as a detected target an echo that occurs above the threshold level. Some conventional sonar systems require more than one such echo above the threshold level at the same or similar range before a target detection is determined.

As described above, it is known that a target detection is probabilistic. In other words the detection is made with a certain probability of detection and a certain probability of false alarm (i.e., that the detection is not real). For example, there may be a 90% probability that a target echo that is actually present in an active ping cycle will be detected, and a 0.01% probability that a target echo that is detected is actually a false alarm. Note that these probabilities need not add to 100%.

In contrast, using systems and techniques described herein, it will become apparent that the existence and detection of a periodic EPRI (for the case of a periodic PRI) provides further information to reduce a probability of false alarm, and, in some embodiments, by way of detection threshold modification, to increase a probability of detection from those that are achieved with a conventional active sonar system.

Figure 2:
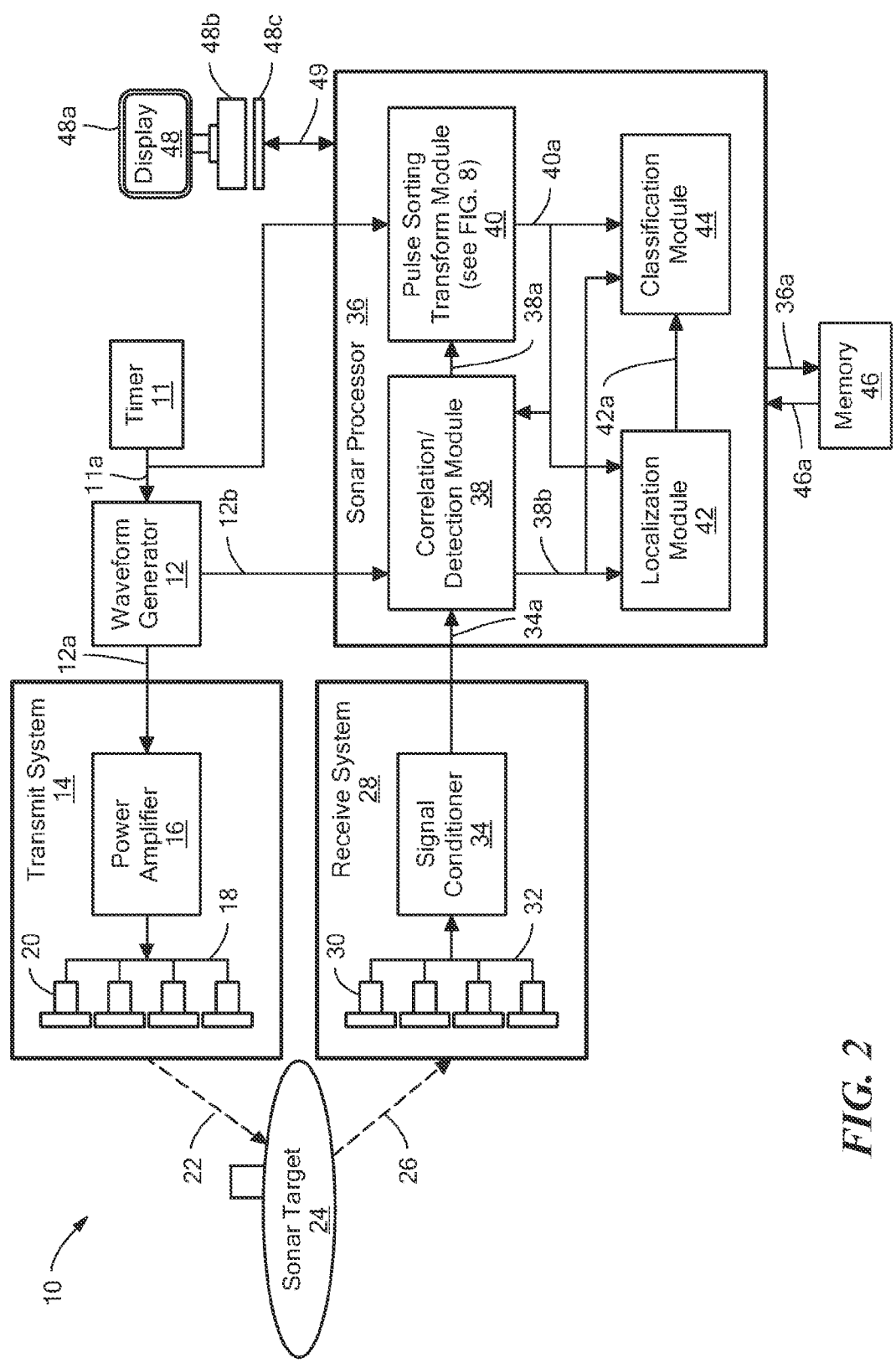
FIG. 2 is a block diagram showing a sonar system in accordance with the present invention comprising a sonar processor having a pulse sorting transform (PST) module.

Referring now to FIG. 2, an exemplary sonar system 10 includes a waveform generator 12 configured to generate a waveform 12a, which can be the same as or similar to a waveform 12b. The waveform 12a can be generated in periodic instances (pings) of the waveform 12a under control of a timing signal 11a (a PRI signal) provided by a timer 11.

Each ping of the waveform 12a can be selected from among a single frequency pulse, a multi-frequency pulse, a frequency modulated continuous wave (FMCW) sweep, a spread spectrum pulse (for example, a pseudo-random noise pulse), or any combination thereof.

The sonar system 10 can also include a transmit system 14. The transmit system 14 can include a power amplifier 16 coupled to receive the waveform 12a and configured to generate one or more transmit signals 18. A transmit array 20 disposed in the water, for example, in the ocean, is coupled to receive the one or more transmit signals 18 and configured to project sound 22 into the water. The sound 22 projected into the water, like the waveform 12a, can be a single frequency pulse, a multi-frequency pulse, a frequency modulated continuous wave (FMCW) sweep, a spread spectrum pulse (for example, a pseudo-random noise pulse), or any combination thereof, repeated at the PRI, in accordance with the PRI signal 11a.

Like the waveform 12a, the pulse of sound 22 can be generated in periodic instances of the pulses 22, at the PRI.

In some arrangements, the sound 22 transmitted by the transmit array 20 is substantially omnidirectional in horizontal and vertical planes. In other arrangements, the sound transmitted by the transmit array 20 is somewhat directional in at least one of the horizontal or vertical planes, for example, limited to approximately one hundred eighty degrees. In still other arrangements, the sound 22 transmitted by the transmit array 20 is contained in one or more directional beams, for example, beams having beamwidths of less than forty-five degrees in at least one of the horizontal or vertical planes.

The sonar system 10 also includes a receive system 28. The receive system 28 can include a receive array 30 disposed in the water and configured to receive sound 26 (background noise and target echoes) propagating in the water. The receive array 30 can be in one of a variety of forms (linear, planar, or volumetric) and can be used to generate a plurality of receive signals 32.

The receive array 30 can have a plurality of receive elements, each of which can have a respective directional beampattern. However, in other embodiments, each one of the plurality of receive elements of the receive array 30 can have a substantially non-directional (i.e., omnidirectional) or widely directional beampattern, in which case, electronic beamforming techniques can be used to generate a plurality receive signals corresponding to a plurality of directional receive beampatterns.

The receive system 28 can include a signal conditioner 34 coupled to receive the plurality of receive signals 32 and configured to generate a conditioned signal 34a. In some embodiments, the conditioned signal 34a can include a plurality of signals 34a, each representative of a beamformed signal corresponding to sound received from a respective direction in the water. To this end, in some embodiments, the signal conditioner 34 can include a beamformer configured to generate the plurality of conditioned signals 34a. However, in other embodiments, the signal conditioner 34 does not include a beamformer and the plurality of conditioned signals 34a is representative of the plurality of receive signals 32, but in amplified form.

The timing signal 11a can result in certain timings of the signals 12a, 12b in an active sonar system arrangement. The timing of signals 11a, 12a, and 12b can be representative of a PRI.

The sonar system 10 can also include a sonar processor 36. It should be understood that blocks identified as modules within a sonar processor 36 can be hardware module, software modules, or any combination of hardware and software modules.

The sonar processor 36 can include a correlation and detection module 38 coupled to receive the plurality of conditioned signals 34a and configured to perform detection processing upon the signals 34a, e.g., correlation and detection (e.g., threshold generation and threshold detection). In some embodiments, the correlation function provides a cross-correlation between the waveform 12b and the plurality of conditioned signals 34a. A correlation function output that provides a sufficiently high result (i.e., is above a threshold) results in identification of an echo (i.e., a target), e.g. the echo 26 from the object 24, and an associated detection of the object 24.

As described above, various acoustic noise pulses not associated with the echoes 26 can result in false detections (false alarms), which may result in a false detection of an object not actually in the water. In essence, the correlation and detection module 38 produces initial detections 38a that have respective probabilities of detection and respective probabilities of false alarm.

In some other embodiments, the correlation and detection module 38 is instead only a detection module 38 configured to compare the plurality of conditioned signals 34a to a threshold, without a correlation being performed.

It will be understood that the correlation function or the detection function also provides a time delay value representative of a time difference from transmission of sound, e.g., the ping 22, to receipt of a detected echo, e.g., the echo 26. As described above in conjunction with FIGS. 1 and 1A, it will be further understood that the time delay value is representative of a range to the target 24.

The echo 26 is identified in one or more of the plurality of conditioned signals 34a, each one of which may be indicative of an echo received from a respective direction. Therefore, the correlation and detection module 38 is configured to generate signal 38a, 38b having a variety of information therein, for example, cross-correlation function initial detection times, time delays (or ranges) associated with each respective initial detection time, ping cycle number (PRI number), and pointing directions of the receive beam or receive beams in which the initial detections occurred.

For clarity, much of the further discussion will focus upon one target, though several targets may be detected at the same time by the correlation and detection module 38.

The sonar processor 36 can also include a localization module 42 coupled to receive the signal 38b. The localization module 42 is configured to analyze the range to the target and the pointing direction of the receive beam or beams in which the target detected. With this information, it will be understood that, knowing also the depth of the transmit array 26 and the receive array 30, the localization module 42 can geometrically determine range and bearing of the initially detected target. In some embodiments, the localization module can also determine a depth of the initially detected target, resulting in a three-dimensional localization of the target 24. It will be understood that sound travelling in water tends to bend in direction, most particularly in a vertical direction. Thus, it may only be possible to determine the depth of the target for close-range targets, e.g., targets within about one mile of the active sonar system 10.

In some embodiments, the localization module 42 can use other methods to determine target depth (and or target classifications), for example methods described in U.S. patent application Ser. No. 12/628,483, filed Dec. 1, 2009, or in U.S. Pat. No. 7,315,488, issued Jan. 1, 2008, both of which are assigned to the assignee of the present invention.

The sonar processor 36 can also include a classification module 44 coupled to receive the signal 38b and also coupled to receive a signal 42a indicative of the target depth determined by the localization module 42. The classification module 44 is configured to classify the target 24 as a submarine or surface ship based upon the signal 42a indicative of the target depth and also based upon a computed range rate of the target.

The sonar processor 36 can also include a pulse sorting transform (PST) module 40 coupled to receive the signal 38a having the above described initial detections and initial detection times. The PST module 40 is coupled to receive the initial detections and initial detection times 38a and coupled to receive the PRI timing signal 11a.

As described in greater detail below in conjunction with FIG. 8, in some embodiments, the PST module 40 can include one or more of its own detection module, localization module, or classification module. Therefore, the signal 40a can include at least one of additional detection, localization, or classification information that can be provided to the correlation and detection module 38, to the localization module 42, or to the classification module 44 in order to refine the detection, localization, or classification of a target otherwise provided. The PST module 40 can at least provide PST detections and PST detection times in the signal 40a, which have improved probabilities of detection and improved probabilities of false alarms compared with the initial detections and initial detection times with the signal 38a generated by the correlation/detection module 38.

In other embodiments, the additional detections, localizations, or classifications generated by the PST module 40 can be otherwise partitioned into the correlation and detection module 38, the localization module 42, or the classification module 44. In these embodiments, the signal 40a can have content similar to that of the signal 38b, for example, PST detections, PST detection times, time delays (or ranges) associated with the PST detection times, and pointing directions of the receive beams in which the target was detected. In these embodiments, the correlation and detection module 38, the localization module 42, or the classification module 44 can process the signal 40a in a way similar to that described above for the signal 38b.

It will become apparent that the initial detection times 38a provided by the correlation and detection module 38 can be further processed by (i.e. filtered by) the PST module 40 to better remove false detections and associated false detection times that are associated acoustic noise in the water rather than with an echo from a target.

In operation, the PST module 40 can use the timing signal 11a to identify in which ping cycle the initial detection times 38a occur. However, in other embodiments, the PST module 40 is not coupled to receive the timing signal 11a, and instead, as described above, the initial detection times 38a can be tagged with a ping cycle number representative of the ping cycle in which they occurred.

In some embodiments, using the signal 40a, the localization module 42 can localize the target in a way similar to that described above, but using the PST detection time, range to the target, and receive beam pointing direction provided by the PST module 40 rather than the initial detection time 38b provided by the correlation and detection module 38.

Similarly, the classification module 44 is coupled to receive the signal 40a and configured to classify the target based upon the signals 40a, 42a.

The sonar system 10 can include a memory 46, i.e., a computer-readable storage medium 46, coupled to receive a signal 36a from the sonar processor 36. The memory 46 can generate signals 46a coupled to the sonar processor 36. Some of the signals 46a can be computer instructions, i.e., program code, provided to the various modules within the sonar processor 36.

The sonar processor 36 can be coupled to provide signals 49 to and from another computing platform 48 having a display 48a, a computer processor 48b, and a keyboard 48c.

Figure 3:
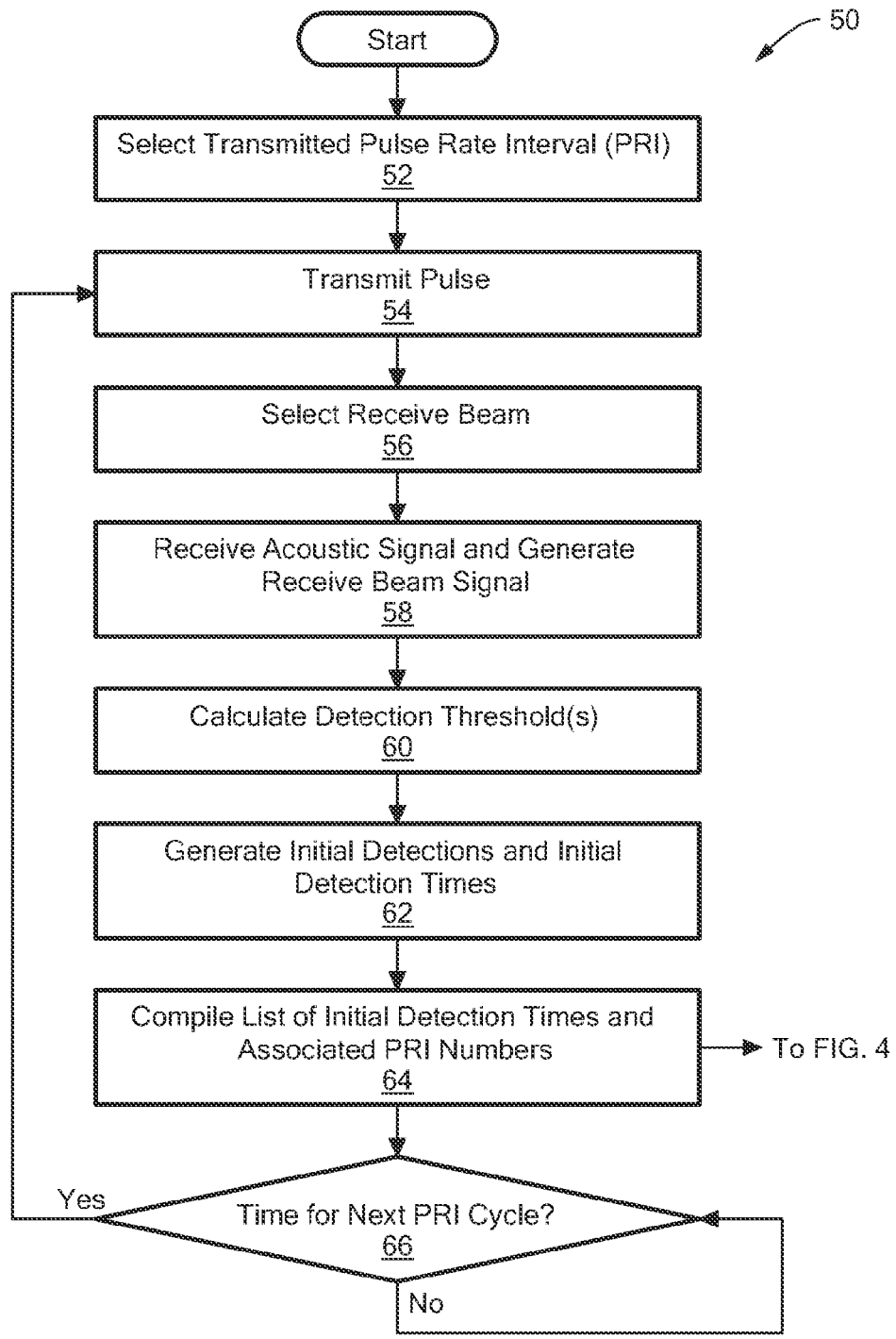
FIG. 3 is a flow chart showing a process that can be used by the sonar system of FIG. 2.
Figure 4:
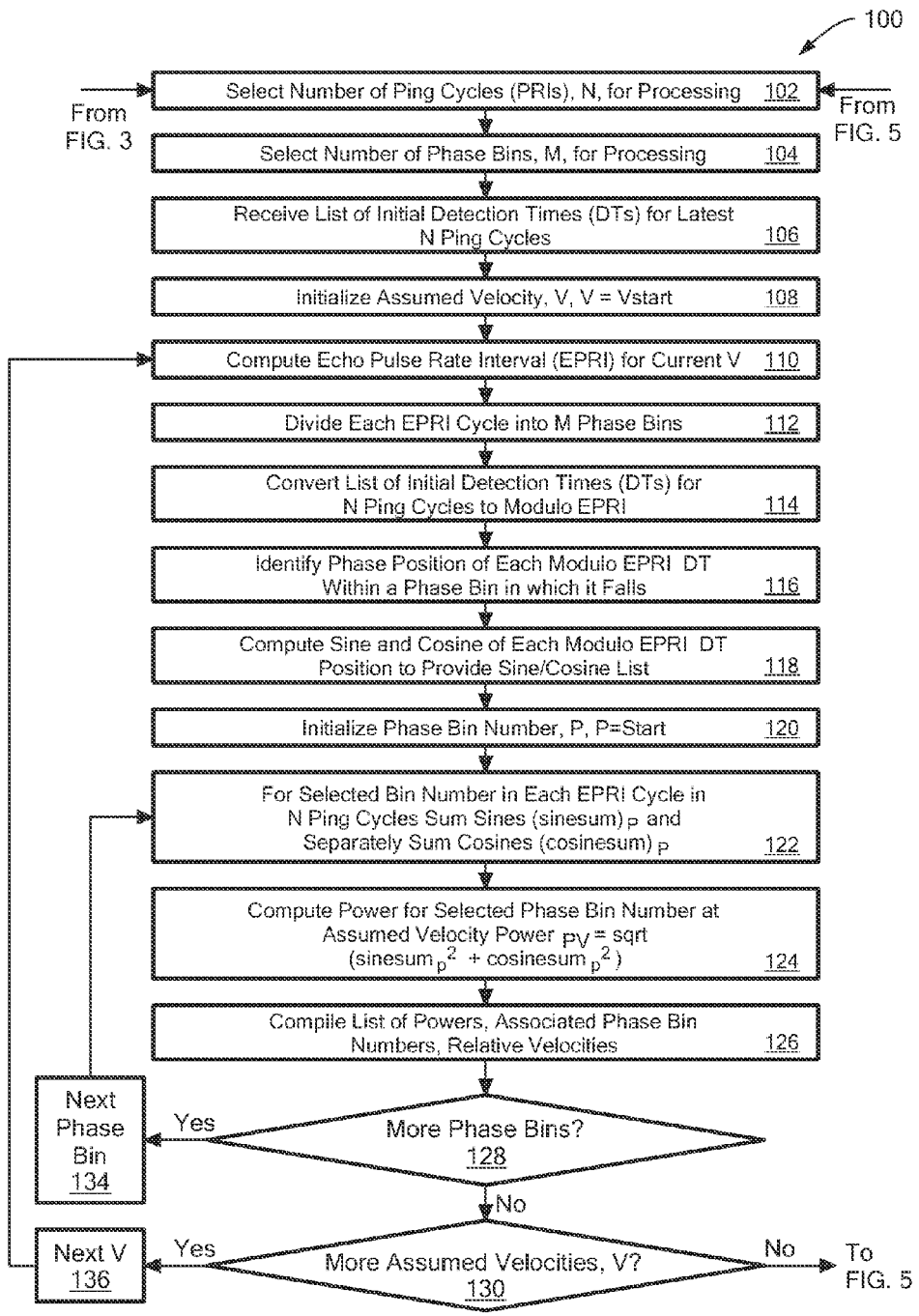
FIG. 4 is a flow chart showing further process blocks that can be used by the sonar system of FIG. 2.
Figure 5:
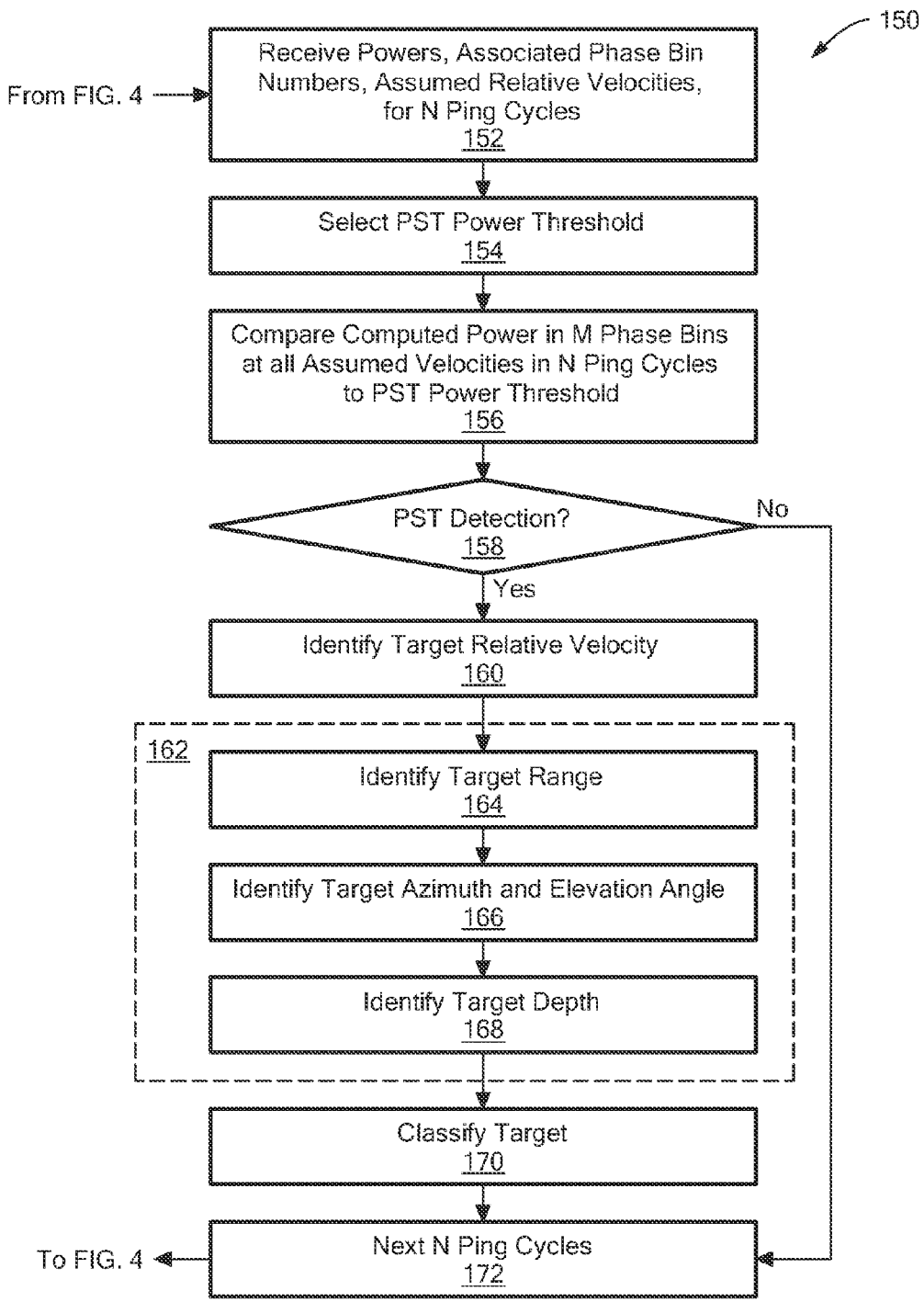
FIG. 5 is a flow chart showing still further process blocks that can be used by the sonar system of FIG. 2.

It should be appreciated that FIGS. 3-5 show flowcharts corresponding to the below contemplated technique which would be implemented in sonar or computer system 10 (FIG. 2). Rectangular elements (typified by element 52 in FIG. 3), herein denoted "processing blocks," represent computer software instructions or groups of instructions. Diamond shaped elements (typified by element 66 in FIG. 3), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

For clarity, FIGS. 3-5 show processes that can be performed by the sonar system 10 of FIG. 2, but for one receive beam and one corresponding receive beam signal. It will be recognized that the same processes can be performed on a plurality of receive beams in variety of ways, in parallel, in serial, or in a nested fashion. Feedback loops associated with a plurality of beam are omitted from FIGS. 3-5. However, in some instances, a plurality of receive beams is mentioned in particular aspects below.

Referring now to FIG. 3, a process 50 can be performed by the sonar system 10 of FIG. 2. The process begins at block 52, where a transmitted pulse rate interval (PRI) is selected. The PRI is selected in accordance with a maximum expected range to a target. As is known, sound propagates in water with a speed of about 5000 feet per second, depending upon depth, water temperature, and water density, which is influenced by salinity. Therefore, if a maximum range to a target is expected to be 15,000 feet, a PRI of six seconds can be selected. This time is representative of the time that it takes a transmitted sound pulse generated by the sonar system 10 of FIG. 1 to reach the target 24 at a range of 15,000 feet plus the time that is takes the echo 26 to return to the sonar system 10.

At block 54, the sonar system 10 transmits the acoustic pulse 22 (FIG. 2), i.e., a ping. At block 56, the sonar system 10 selects one receive beam from a plurality of receive beams for further processing.

At block 58, the sonar system 10 receives an acoustic signal and generates the corresponding selected receive beam (i.e., beamformed) signal. The acoustic signal received at block 58 may or may not include the echo 26 (FIG. 2) from the object 24 (FIG. 2).

At block 60, in some embodiments of the sonar system 10, e.g., systems having the correlation and detection module 38 of FIG. 2, the sonar system 10 calculates a detection threshold. In some embodiments, the detection threshold can be calculated by performing the above-described cross-correlation between the transmit waveform 12b of FIG. 2 with each one of the plurality of conditioned signals 34a of FIG. 2 (e.g., with the receive beam signal of block 58) and finding a correlation time during which no correlation peaks occur. Then, the detection threshold can be calculated to be some amount, for example, six decibels, above the correlation function output having no correlation peaks.

In some embodiments, the threshold is calculated for one correlation associated with one receive beam in the plurality of receive beams in the conditioned signal 34a of FIG. 2 and the one threshold is thereafter used in conjunction with correlations of all of the received beams (or the one receive beam of FIGS. 3-5) in the plurality of conditioned signals 34a (or the one beam signal of block 58). However, in other embodiments, a separate threshold is computed and used for each one of the correlations of each one of the receive beams within the plurality of conditioned signals 34a. In still other embodiments, the threshold is a fixed predetermined threshold used for all beams.

While it is described above that a correlation function can be used, as described above in conjunction with FIG. 2, in some embodiments, no correlation function is used and instead, the threshold can be computed directly by examining the each one of the plurality of conditioned signals 34a (e.g., the receive beam signal of block 58). Thus, similar to that described above described above, in some embodiments, the threshold is calculated for one receive beam in the plurality of conditioned signals 34a and the one threshold is thereafter used in conjunction with all of the received beams in the plurality of conditioned signals 34a. However, in other embodiments, a separate threshold is computed and used for each one of the receive beams within the plurality of conditioned signals 34a. In still other embodiments, the threshold is a fixed predetermined threshold.

At block 62, either the correlation of the receive beam signal of block 58 is compared with the associated detection threshold calculated at block 60 or the receive beam signal itself is directly compared with associated detection threshold to generate initial detection times (DTs) associated with the selected receive beam. These initial detection times are assumed to be associated with initial detections. It will be understood from discussion below that these are, in effect, conventional detections and associated conventional detection times that can be filtered by the PST processing of FIG. 4 to provide PST detections and PST detection times.

At block 64, a list of the initial detections, i.e., initial detection times (DTs), is formed, i.e., compiled, along with an associated receive beam identifier and an associated PRI cycle number identifier(s). The list of initial detection times, associated receive beam identifier, and PRI cycle number identifier(s) is sent to the process of FIG. 4.

It will be appreciated that the list of initial detection times compiled at block 64 is thus far associated with only one transmitted acoustic pulse 22 of FIG. 2. However, at block 66 it is determined whether it is yet time for the next ping cycle, i.e., if the above-described PRI has been achieved (e.g., six seconds). If at block 66, it is time for the next PRI cycle, the process returns to block 54, where another acoustic ping is transmitted, starting the next PRI. The list is thus compiled at block 64 for a plurality of PRIs.

Referring now to FIG. 4, a process 100 can be performed by the PST module 40 of FIG. 2. The process 100 begins at block 102, where a number of ping cycles (PRIs), N, is selected for processing. For example, the process 100 can select about ten ping cycles upon which to operate. However, at block 102, the process 100 can select any number of ping cycles upon which to operate so long as the number of ping cycles is two or more.

The number of ping cycle selected at block 102 is selected to reduce false alarms to an acceptable value without violating timeliness requirements. Timeliness can be determined according to application. For example, if the active sonar system is configured to detect incoming torpedoes, which are fast moving, only a small number of ping cycles, for example four to six ping cycles, can be used. Against slower targets and with low relative velocities, fifteen or more ping cycles can be used. It will be understood that the probability of false alarm tends to decrease as more ping cycles are used.

At block 104, a number of phase bins, M, is selected. As described below, each PRI cycle will be divided into the M phase bins. For example, the process can select about four hundred phase bins. However, at block 104, the process 100 can select any number of phase bins upon which to operate so long as the number of phase bins is two or more. The term phase bin is used herein for reasons that will be better understood from discussion below. However, the phase bins are merely a partitioning of each EPRI into a plurality of shorter time segments.

The number of phase bins selected at block 104 is selected in accordance with a desired probability of false alarm. It will be understood that the probability of false alarm tends to decrease as more phase bins are used, up to a point. However, the ability to measure the time of arrival of a true echo is another factor in selecting the number of phase bins. It is desired that true target echoes fall consistently in the same part of a phase bin, which would not be the case if too many phase bins are selected and the resulting phase bins are too narrow (in time). In one particular embodiment, the number of phase bins is selected to result in phase bins having a width that is about eight times as wide as the expected measurement accuracy of time of arrival of a target echo, which depends in part upon the signal to noise ratio of the target echo.

The number of phase bins, M, that are selected is determined according to a number of factors. In general, a greater number of phase bins increases range and relative velocity resolution but at the expense or greater processing load. A greater number of phase bins also tends to reduce a probability of false alarm and to increase a probability of detection provided by or associated with the PST module 40 of FIG. 1.

At block 106, the list of initial detection times and associated receive beam identifier and receive beam number identifier for the selected number of ping cycles, N, is received from block 64 of FIG. 3.

At block 108, an initial assumed relative velocity between the sonar system 10 of FIG. 1 and the target 24 of FIG. 1 is selected. In some embodiments, the selected initial assumed relative velocity is zero. However, for other embodiments, the selected initial assumed relative velocity is not zero, for example, one knot.

In some arrangement, the active sonar system 10 is used to search for stationary objects, for example, mines. In these systems, there is only one relative velocity, which is the velocity of the platform or ship that carries the active sonar system. However, it is known that velocity, relative to the earth, of a platform moving in the water is difficult to measure, since the water tends to be moving in currents. Thus, even for active sonar systems that search for stationary objects, more than one assumed velocity may be desirable, which are used in the loops described below in conjunction with block 130.

The assumed relative velocity can be representative of a relative velocity along the selected beam pointing direction. However, in other embodiments, the assumed relative velocity can be an assumed relative velocity projected to a horizontal plane.

At block 110, an echo pulse rate interval (EPRI) corresponding to the selected relative velocity from block 108 is computed. It will be recognized from discussion above in conjunction with FIGS. 1 and 1A that only at a relative velocity of zero does the PRI match the EPRI. At all other relative velocities, the PRI and the EPRI are different. However, as also described above in conjunction with FIGS. 1 and 1A, for a periodic PRI (and a constant relative velocity) the EPRI is also periodic.

Though discussion herein uses a constant or periodic PRI, it will be apparent that an active sonar system can also use a non-constant PRI and still a periodicity of the resulting EPRI can be resolved with processing not discussed herein.

At block 112, the calculated EPRI is divided into the M phase bins, i.e., into M time segments.

At block 114, the list of initial detection times received at block 104 can be converted to a list of modulo EPRI times. In other words, each received initial detection time can be converted to a factor of the EPRI, for example, a factor of a times the EPRI, where α is between 0 and 1. Thus an initial detection time that would otherwise be, for example, at 2.2 times the EPRI in real time (i.e., within a second actual EPRI), can be converted to 0.2 times the EPRI. In this way, it will be recognized that subsequent processing can, in effect, be performed using but one mathematical EPRI. However, in other embodiments, it will be recognized that block 114 can be omitted and the processing can be performed among all of the actual EPRIs.

At block 116, each modulo EPRI detection time can be examined to determine in which phase bin it falls and where it falls within the phase bin. For example, a modulo EPRI detection time may occur at 0.1 EPRI, which may fall into phase bin 105. Another modulo EPRI detection time may occur at 0.11 EPRI, which may also fall into phase bin 105 but at a slightly different position within the phase bin.

At block 118, for each modulo EPRI detection time and for each identified phase bin into which it falls, using a phase bin width of 2π (hence phase bin), the position, α, of the modulo EPRI detection time within the phase bin can be converted to a sin α and a cos α. Therefore, at block 118 a list of sine and cosine pairs can be generated, wherein each sine and cosine pair is associated with a phase bin and with a modulo EPRI detection time, and also, with an initial detection time. Each sine and cosine pair is also associated with the selected receive beam. It will be recognized that there can be a plurality of sines and cosines associated with any one phase bin number, e.g., with phase bin 105. For example detection times of 1.2 EPRI and 2.2 EPRI, i.e., within two successive EPRIs, when converted to modulo EPRI, will both be at 0.2 EPRI and both will fall within the same phase bin and each will have an associated sine and cosine pair.

At block 120, a phase bin number, P, within the EPRI can be initialized, and that phase bin will be processed first. For example, above it is described that, in some embodiments, the EPRI can be divided into about four hundred phase bins. At block 120, the initial selected phase bin can be the first phase bin in the EPRI. However, it will be recognized that the phase bins are associated with a range to the target. Thus, processing of some of the phase bins may not be desired. Therefore, in other embodiments, at block 120, the phase bin number, P, can be initialized to another value, for example one hundred, or to any value representative of a minimum realistic range to the target.

At block 122, for the selected phase bin number, the sines for that phase bin can be added together to generate a value "sinesum$_P$," and the cosines for that phase bin can be separately added together to generate a value "cosinesum$_P$," where the subscript, P, is indicative of the phase bin number." Then at block 124, a power associated with the selected phase bin number can be computed as sqrt (sinesum$_P^2$+cosinesum$_P^2$).

It will be apparent that modulo EPRI detections that more closely align in time (e.g., for a correct assumed relative velocity and a correct computed EPRI) result in a higher computed power level. In other words, it will be appreciated that, if the relative velocity and the resulting calculated EPRI are correct for a particular target, then the modulo EPRI detection times will appear in the same phase bin, and, depending upon the accuracy of the calculated EPRI in reflecting the actual target relative velocity, the position of the modulo EPRI detection times will overlay at the same position or lie at different positions within the same phase bin. The more modulo EPRI detection times that are within the same phase bin and the more closely they are positioned to overlie within the same phase bin, the higher the computed power associated with the phase bin will be.

It will be further be appreciated that the above calculation for power is but one way in which the power of the modulo EPRI detection times in particular phase bins can be computed. Other calculations can produce a similar desired outcome, namely, an identification of phase bins, if any, having the most closely spaced modulo EPRI detection times. For example, in other embodiments a spread factor can be identified, which characterizes the spread of converted detection times within a phase bin, e.g., a percentage of a phase bin extent.

It will also be appreciated that the more converted detection times that are within the same phase bin and the more closely they are positioned to overlie within the same phase bin, the more likely it is that the calculated EPRI is correct and the more likely it is to be periodic as shown and described in conjunction with FIGS. 1 and 1A. Thus, the overlying converted detection times are more likely to be representative of a target detection and not a false target detection, i.e., noise.

At block 126, a list of phase bin powers, associated phase bin numbers, associated relative velocities, and the selected beam, is generated, i.e., compiled.

At block 128, it is determined if there are more phase bins to consider. If there are more phase bins to consider, a next phase bin is selected at block 134 and the process returns to block 122.

If there are no more phase bins to consider, the process continues to decisions block 130. At block 130, it is determined whether there are more potential relative velocities between the sonar system and the target to consider. If there are more velocities to consider, the process can continue to block 136, where a next relative velocity is selected and the process then returns to block 110, where a new EPRI is calculated.

Selection of the steps of the relative velocity can be important, since the accuracy of the assumed relative velocity can impact magnitudes of the powers calculated at block 124. In some embodiments, a step size of 0.2 knots is selected. However, any step size less than about two knots should provide reasonable results.

If there are no more relative velocities to consider, then the process proceeds to FIG. 5.

In some embodiments, for each assumed relative velocity, the number of phase bins selected at block 104 is the same. However, in other embodiments, the number of phase bins selected at block 104 is selected in accordance with the relative velocity selected at block 136. It will be recognized that a shorter EPRI corresponds to a higher relative velocity. If the same number of phase bins were used in the shorter EPRI, the resolution of the range to the target associated with each phase bin would be greater for the shorter EPRI. Thus, in some embodiments, for a shorter EPRI, a smaller number of phase bins can be selected at block 112.

Referring now to FIG. 5, at block 152, the table (generated by way of block 126 of FIG. 4) of phase bin powers with associated phase bin numbers and with assumed relative velocities and with the receive beam number is received for the N ping cycles to be processed.

At block 154, a power threshold is selected. In some embodiments, the power threshold can be calculated by finding an interval during which no peaks occur in the received power table. Then, the power threshold can be calculated to be some amount, for example, six decibels, above the region having no power peaks. In some embodiments, the power threshold is calculated for one receive beam and the one threshold is thereafter used in conjunction with all of the received beams. However, in other embodiments, a separate power threshold is computed and used for each one the receive beams. In still other embodiments, the power threshold is a fixed predetermined power threshold.

In still other embodiments, the PST threshold can be different for each one of the M phase bins. For example, the PST threshold for each phase bin can be calculated by finding a respective local window around each phase bin and selecting a power threshold to be some amount, for example, six decibels, above an average of the powers in the phase bins in the local window. In other embodiments, an entire EPRI cycle for a receive beam can be used to identify a threshold, in which case, peaks can be removed and the rest of the signals levels in the EPRI cycle can be averaged to generate the one threshold used for the entire EPRI cycle. Other techniques can also be used to generate one or more power thresholds At block 156 the list of powers received at block 152 is compared with the power threshold. If a power is above the power threshold, then at block 156, a PST detection of a target is identified and the process continues to blocks 160. It should be appreciated that the PST detections and PST detection times thus formed at block 156 for the N ping cycles comprise a filtered list (i.e., an improved list of detections having a lower probability of false alarm and, if a lower detection threshold is used as a result, a higher probability of detection) of the initial detections and initial detection times generated at block 64 of FIG. 3.

At block 160, a relative velocity between the sonar system and the detected target can be readily identified from the list received at block 152. Namely, a phase bin having a power above the power threshold is already associated with a relative velocity by way of the EPRI with which it is associated.

The process then continues with a group of blocks 162, which determine a localization of the target in range, azimuth angle, and depth. At block 164 a range to the target along the beam pointing direction can be readily determined from the list received at block 152. Namely, the phase bin having the power above the power threshold is readily associated with a range to the target as described above in conjunction with FIGS. 1 and 1A.

At block 166, a target azimuth and elevation angle are determined merely by identifying the azimuth and elevation angle of the receive beam (receive beam number) in which the phase bin having the power above the power threshold occurred.

At block 168, knowing the elevation angle and the range to the target, a depth of the target can be identified by techniques described above in conjunction with FIG. 2.

At block 170, the target can be classified at least based upon the depth of the target. For example, if the target is underwater, it is likely to be a submarine, though it could also be a large biological entity like a whale. A localization of the target with time can be further used to classify the target, since a detected submarine would tend to travel at a constant depth and velocity.

The process is then complete for the N ping cycles or PRIs. At block 172 a next group of N ping cycles is selected and the process returns to block 104 of FIG. 4. It should be recognized that, in some embodiments, the next N ping cycles can be only offset by only one ping cycle from those processed to this point. However, the offset can be any number greater then one. In one embodiment the first one of the next N ping cycles is immediately after the last one of the present N ping cycles.

In other embodiments, a different EPRI or a different number of ping cycles, N, can be selected upon return to block 102 in accordance with a variety of factors, including a range to the target, a probability of detection of the target, a relative velocity of the target, and a desired localization resolution of the target. In other words, the number of ping cycles and the assumed relative velocities selected at the return to block 102 may be a different each time the process arrives at block 102.

As an example of the process of FIG. 4, consider an active sonar pinging at four-second intervals (PRI=4 seconds, or ping rate frequency (PRF)=0.25 Hz) searching for targets with closure rates (relative velocities) between −40 forty knots (opening) and +40 knots (closing). Assume a maximum range of such a sonar system to be about 3000 meters, and assume a sound speed of 1500 m/sec. Also, select a desired closure rate accuracy, i.e., the step size of velocity, V, in block 136 of FIG. 4, to be ½ knot. These parameters result in a need to evaluate the PST at 161 relative velocities, going from −40 knots in half-knot steps to +40 knots. For simplicity, in this example, we can select a corresponding 161 phase bins (β=161 phase bins, each covering about 19 yards of range), i.e., in block 104 of FIG. 4, although it may be desirable to use more phase bins.

Table 1 below shows initial target detection times in second, as made, for example, at block 64 of FIG. 3. In particular, Table 1 shows a five-ping simulated data set of initial detection times containing two targets (a +25-knot target at initial range of 500 meters and a −10-knot target at an initial rage of 2000 meters) plus ten randomly occurring false alarms in each ping cycle. These initial detection times approximately correspond to the output of a sonar detection system for a 90% probability of detection when the signal-to-noise ratio is 13 dB. The data set of Table 1 has sixty detection reports, only ten of which are from targets, the rest being false alarms.

TABLE 1

| Ping 1 | Ping 2 | Ping 3 | Ping 4 | Ping 5 |
|--------|--------|--------|--------|--------|
| 0.1972 | 0.0529 | 0.1141 | 0.0759 | 0.2633 |
| 0.3055 | 0.0553 | 0.2054 | 0.3086 | 0.3890 |
| 0.3928 | 0.5930 | 0.3730 | 0.4570 | 0.6359 |
| 0.6610 | 1.4438 | 0.5250 | 1.4427 | 0.7264 |
| 1.1578 | 2.0553 | 0.5778 | 1.6255 | 0.9244 |
| 2.6758 | 2.0923 | 0.9019 | 1.6445 | 1.0731 |
| 2.7778 | 2.7034 | 1.3199 | 1.9580 | 1.2002 |
| 3.0175 | 3.0574 | 2.0563 | 2.1894 | 1.8730 |
| 3.5253 | 3.5675 | 2.5031 | 2.7584 | 2.3381 |
| 3.7931 | 3.5896 | 2.7309 | 2.7641 | 2.4363 |
| 3.8686 |        | 2.8335 | 2.9357 | 2.6363 |
| 3.9744 |        | 3.8713 | 3.8387 | 2.7094 |
| 3.9763 |        |        |        | 2.7860 |

Figure 6:
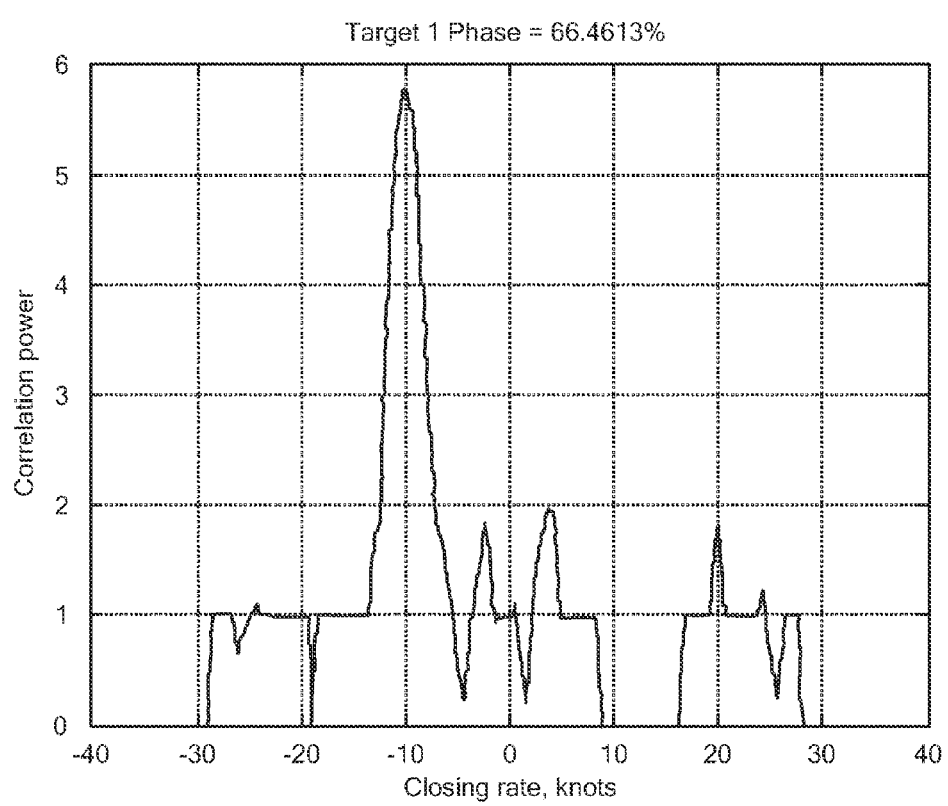
FIGS. 6 and 7 are graphs showing two target detections made using the PST process.
Figure 7:
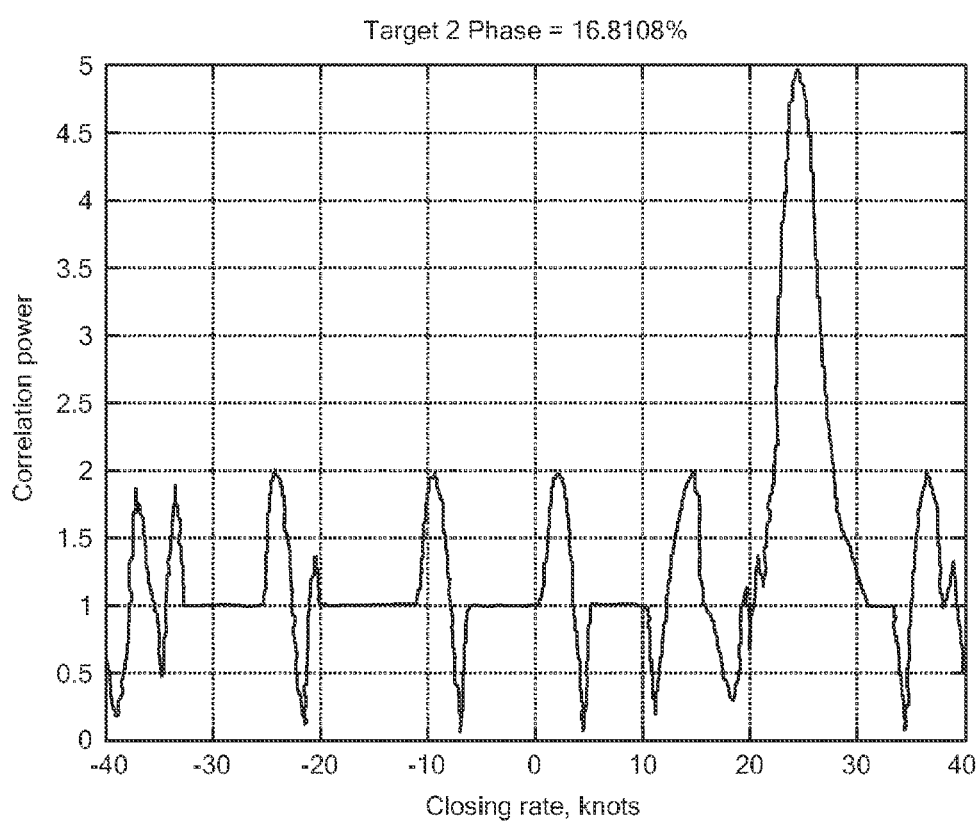

Referring now to FIGS. 6 and 7, graphs include horizontal scales with units of closing rate (relative velocity), with units of knots, and vertical scales with units of power in arbitrary units. Using the PST to transform the list of initial detection times shown in Table 1 results in data presented in the graphs of FIGS. 6 and 7, which can be plotted data derived at block 126 of FIG. 4. The graph of FIG. 6 results from a phase bin phase of 66.4613% and the graph of FIG. 7 results from a phase bin phase of 16.8108%.

Here it will be understood that percent is equivalent to phase bin number. For example, a percent of 66.4613% is equivalent to a phase bin centered 66.4613% of the way from the beginning to the end of each EPRI cycle. The two percentages above are related to two phase bins, and therefore, to two different targets, and two respective different relative velocities within Table 1. A first target has a relative velocity of about −10 knots (FIG. 6) and a second target has a relative velocity of about 25 knots (FIG. 7). By using PST techniques, any number of targets, each with a respective relative velocity can be identified from with initial target detections.

As can be seen, two very distinct peaks appear, indicating that there are two periodic pulse trains in data set of Table 1. The magnitude of these peaks is related to the number of ping cycles in which a member of the pulse train was present.

It will be appreciated that the data presented in the graphs of FIGS. 6 and 7 has not yet been thresholded by the process described in conjunction with blocks 154-158 of FIG. 5. However, most likely, the largest peak in each one of FIGS. 6 and 7 corresponds to a PST detection.

Figure 8:
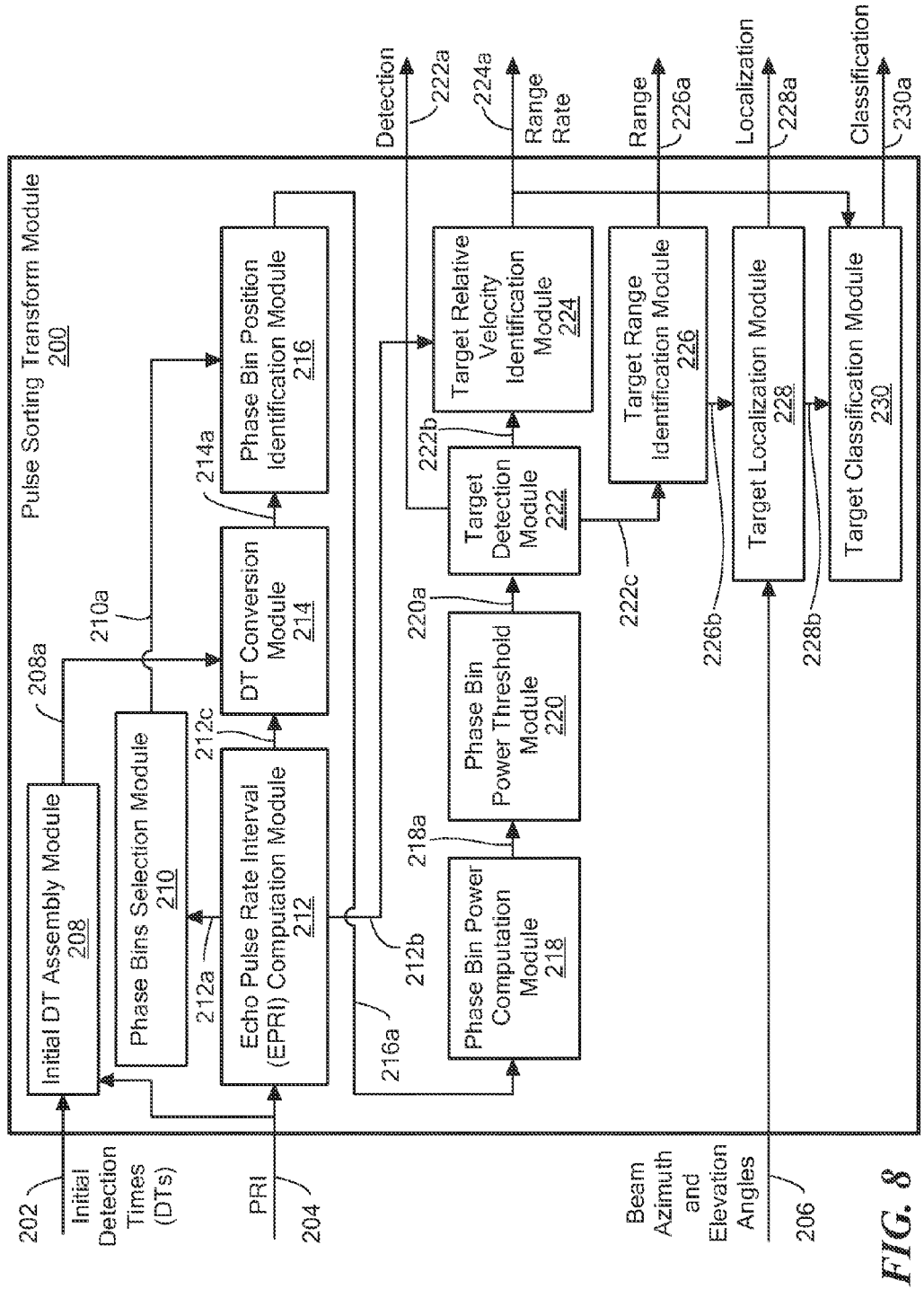
FIG. 8 is a block diagram showing details of a PST module that can be used as the PST module of FIG. 2.

Referring now to FIG. 8, a pulse sorting transform (PST) module 200 can be the same as or similar to the PST module 40 of FIG. 2. The PST module 200 is coupled to receive initial detection times 202 (and associated detections), for example, initial detections and initial detection times 38a provided by the correlation and detection module 38 of FIG. 2.

The PST module 200 is also coupled to receive a PRI timing signal, for example the timing signal 11a of FIG. 2. In some embodiments, the PRI module 200 is also coupled to receive beam azimuth and elevation angles 206 as may be provided in the signal 38a of FIG. 2.

The PST module 200 can include an initial detection time (DT) assembly module 208 coupled to receive the initial detections and initial detection times 202, coupled to receive the PRI signal 202, and configured to assemble and provide a list 208a of initial detection times and associated PRI numbers as described above, for example, at block 64 of FIG. 3 and associated block 106 of FIG. 4.

The PST module 200 can also include an EPRI computation module 212 coupled to receive the PRI signal 204, configured to select a number of PRIs, N, for processing, configured to generate assumed relative velocities, and configured to calculate corresponding EPRIs 212c for the N PRIs, as described above, for example, in conjunction with blocks 102, 108 and 110 of FIG. 4.

As described above in conjunction with FIG. 2, in operation, the PST module 200 can use the timing signal 204 to identify in which ping cycle the initial detection times 202 occur. However, in other embodiments, the PST module 200 is not coupled to receive the timing signal 204, and instead, as described above, the initial detection times 202 can be tagged with a ping cycle number representative of the ping cycle in which they occurred.

The PST module 200 can also include a phase bin selection module 210 coupled to receive the EPRIs 212a, configured to select number, M, of phase bins for processing, and configured to divide each EPRI cycle into M phase bins 210a, as described above, for example, in conjunction with blocks 104 and 112 of FIG. 4.

The PST module 200 can also include a detection time conversion module 214 coupled to receive the list of initial detection times 208a, coupled to receive the computed EPRIs 212c associated with the N PRIs, and configured to generate a list of modulo EPRI detection times 214a, as described above, for example, in conjunction with block 114 of FIG. 4.

The PST module 200 can also include a phase bin position identification module 216 coupled to receive the list of modulo EPRI detection times 214a, coupled to receive the computed M phase bins 210a, and configured to provide respective positions 216a of each modulo EPRI detection time 214a within respective phase bins, as described above, for example, in conjunction with block 116 of FIG. 4.

The PST module 200 can also include a phase bin power computation module 218 coupled to receive the positions 216a of the modulo EPRI detection times 214a and configured to compute powers 218a of the modulo EPRI detection times in the M phase bins for the N EPRIs, as described above, for example, in conjunction with blocks 118-126 of FIG. 4.

The PST module 200 can also include a phase bin power threshold module 220 coupled to receive the list of computed powers 218a, configured to select or to compute a PST power threshold, configured to compare the powers 218a to the PST threshold, and configured to provide a list 220a of the phase bins that exceed the PST threshold, as described above, for example, in conjunction with blocks 152-156 of FIG. 5.

The PST module 200 can also include a target detection module 222 coupled to receive the list 220a of phase bins that exceed the power threshold, coupled to receive the original list of detection times 208a (coupling not shown for clarity), and configured to identify those PST detections within the list 220a of phase bins that exceed the power threshold (i.e., to provide PST detections), as described above, for example, in conjunction with block 158 of FIG. 5. The target detection module 222 can provide the identified detections (i.e., PST detections) as signals 222a, 222b, 222c, which can be the same signal, having a lower probability of false alarm compared to the corresponding initial detection and detection times. The signals 222a, 222b, 222c can also include information as to the assumed relative velocity (see, e.g., blocks 108 and 130 of FIG. 4), the computed EPRI (see, e.g., block 110 of FIG. 4), and the receive beam number (see, e.g., block 56 of FIG. 3) associated with each PST detection.

The PST module 200 can also include a target relative velocity identification module 224 coupled to receive the signal 222b and configured to identify and provide a respective target relative velocity 224a (range rate) associated with each PST detection, as described above, for example, in conjunction with block 160 of FIG. 5.

The PST module 200 can also include a target range identification module 226 coupled to receive the signal 222c and configured to identify and provide a respective target range 226a, 226b associated with each PST detection, as described above, for example, in conjunction with block 164 of FIG. 5.

The PST module 200 can also include a target localization module 226 coupled to receive the target range 226b, coupled to receive the receive beam azimuth and elevation signal 206, and configured to identify and provide a respective target localization 228a, 228b (range, bearing, and depth) associated with each PST detection, as described above, for example, in conjunction with blocks 166, 168 of FIG. 5.

The PST module 200 can also include a target classification module 228 coupled to receive the target localization 228b and configured to identify an provide a classification 230a for each target associated with each PST detection, as described above, for example, in conjunction with block 170 of FIG. 5.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of sonar signal processing, comprising:
receiving, from a sonar detection module within a sonar processor, a processed signal comprising a plurality of initial detections of a target and associated initial detection times, the processed signal associated with sound transmitted at a pulse rate interval (PRI), and associated with received sound including echoes from a target, the echoes resulting from the transmitted sound;
analyzing, with a pulse sorting transform (PST) module coupled to the sonar detection module, the plurality of initial detection times with a pulse sorting transform configured to identify periodic PST detection times within the plurality of initial detection times that are equally spaced in time and that are representative of the echoes from the target; and
analyzing, with the pulse sorting transform (PST) module, the periodic PST detection times to identify at least one PST detection of the target.

2. The method of claim 1, further comprising analyzing the periodic PST detection times to identify a relative velocity of the target.

3. The method of claim 1, further comprising analyzing the periodic PST detection times to indentify a range to the target.

4. The method of claim 3, further comprising:
receiving a beam elevation angle; and
computing a depth of the target by using the beam elevation angle and the range to the target.

5. The method of claim 4, further comprising:
receiving a beam azimuth angle; and
computing a three-dimensional localization of the target by using the range to the target, the depth of the target, and the azimuth angle.

6. The method of claim 1, wherein the analyzing the plurality of initial detection times comprises:
assuming a relative velocity of the target;
computing an echo pulse rate interval (EPRI) based on the assumed velocity and the pulse rate interval (PRI);
dividing the EPRI into a plurality of phase bins;
converting the plurality of initial detection times to a corresponding plurality of modulo EPRI detection times;
selecting a phase bin in the EPRI;
identifying positions of the modulo EPRI detection times within the plurality of modulo EPRI detection times that fall within the selected phase bin;
computing a power associated with the positions of the modulo EPRI detection times that fall within the selected phase bin;
selecting a power threshold; and
comparing the computed power to the power threshold.

7. The method of claim 6, further comprising identifying a PST detection of the target in response to the comparing.

8. The method of claim 6, further comprising identifying a relative velocity of the target in response to the comparing.

9. The method of claim 6, further comprising identifying a range to the target in response to the comparing.

10. A non-transitory computer-readable storage medium having computer readable code thereon for providing sonar signal processing, the computer-readable storage medium comprising:
instructions for receiving, from a sonar detection module within a sonar detection processor, a processed signal comprising a plurality of initial detections of a target and associated initial detection times, the processed signal associated with sound transmitted at a pulse rate interval (PRI), and associated with received sound including echoes from a target, the echoes resulting from the transmitted sound;
instructions for analyzing, with a pulse sorting transform (PST) module coupled to the sonar detection module, the plurality of initial detection times with a pulse sorting transform configured to identify periodic PST detection times within the plurality of initial detection times that are equally spaced in time and that are representative of the echoes from the target; and
instructions for analyzing, with the pulse sorting transform (PST) module, the periodic PST detection times to identify at least one PST detection of the target.

11. The computer-readable storage medium of claim 10, further comprising instructions for analyzing the periodic PST detection times to identify a relative velocity of the target.

12. The computer-readable storage medium of claim 10, further comprising instructions for analyzing the periodic PST detection times to indentify a range to the target.

13. The computer-readable storage medium of claim 12, further comprising:
instructions for receiving a beam elevation angle; and
instructions for computing a depth of the target by using the beam elevation angle and the range to the target.

14. The computer-readable storage medium of claim 13, further comprising:
instructions for receiving a beam azimuth angle; and
instructions for computing a three-dimensional localization of the target by using the range to the target, the depth of the target, and the azimuth angle.

15. The computer-readable storage medium of claim 10, wherein the analyzing the plurality of initial detection times comprises:
instructions for assuming a relative velocity of the target;
instructions for computing an echo pulse rate interval (EPRI) based on the assumed velocity and the pulse rate interval (PRI);
instructions for dividing the EPRI into a plurality of phase bins;
instructions for converting the plurality of initial detection times to a corresponding plurality of modulo EPRI detection times;
instructions for selecting a phase bin in the EPRI;
instructions for identifying positions of the modulo EPRI detection times within the plurality of modulo EPRI detection times that fall within the selected phase bin;
instructions for computing a power associated with the positions of the modulo EPRI detection times that fall within the selected phase bin;
instructions for selecting a power threshold; and
instructions for comparing the computed power to the power threshold.

16. The computer-readable storage medium of claim 15, further comprising instructions for identifying a detection of the target in response to the comparing.

17. The computer-readable storage medium of claim 15, further comprising instructions for identifying a relative velocity of the target in response to the comparing.

18. The computer-readable storage medium of claim 15, further comprising instructions for identifying a range to the target in response to the comparing.

19. A sonar system comprising:
a pulse sorting transform (PST) module coupled to receive, from a sonar detection module within a sonar signal processor, a processed signal comprising a plurality of initial detections of a target and associated initial detection times, the processed signal associated with sound transmitted at a pulse rate interval (PRI), and associated with received sound including echoes from a target, the echoes resulting from the transmitted sound, wherein the pulse sorting transform module is configured to analyze the plurality of initial detection times with a pulse sorting transform, configured to identify periodic PST detection times within the plurality of initial detection times that are equally spaced in time and that are representative of the echoes from the target, and configured to analyze the periodic PST detection times to identify at least one PST detection of the target.

20. The system of claim 19, wherein the pulse sorting transform module comprises a target detection module configured to analyze the periodic PST detection times to identify a PST detection of the target.

21. The system of claim 19, wherein the pulse sorting transform module comprises a target relative velocity identification module configured to analyze the periodic PST detection times to identify a relative velocity of the target.

22. The system of claim 19, wherein the pulse sorting transform module comprises a target range identification module configured to analyze the periodic PST detection times to indentify a range to the target.

23. The system of claim 22, wherein the pulse sorting transform module further comprises a target localization module coupled to receive the range to the target, coupled to receive a beam elevation angle, and configured to compute a depth of the target.

24. The system of claim 23, wherein the target localization module is further coupled to receive a beam azimuth angle and further configured to compute a three-dimensional localization of the target.

25. The system of claim 19, wherein the a pulse sorting transform module comprises:
  an echo pulse rate interval (EPRI) computation module coupled to receive a pulse rate interval (PRI), configured to compute an echo pulse rate interval (EPRI) based on an assumed relative velocity of the target and the pulse rate interval (PRI);
  a phase bins selection module coupled to receive the EPRI and configured to divide the EPRI into a respective plurality of phase bins;
  a detection time conversion module coupled to receive the initial detection times, coupled to receive the EPRI, and configured to convert the plurality of initial detection times to a corresponding plurality of modulo EPRI detection times;
  a phase bin position identification module coupled to receive the EPRI, coupled to receive the plurality of modulo EPRI detection times, configured to select a phase bin in the EPRI, and configured to identify positions of the modulo EPRI detection times within the plurality of modulo EPRI detection times that fall within the selected phase bin;
  a phase bin power computation module coupled to receive the positions and configured to compute a power associated with the positions of the modulo EPRI detection times that fall within the selected phase bin;
  a phase bin power threshold selection module configured to select a power threshold; and
  a target detection module configured to compare the computed power to the power threshold.

26. The system of claim 25, wherein the PST module is further configured to identify at least one of a PST detection of the target, a relative velocity of the target, or a range to the target in response to the comparing.

* * * * *